United States Patent [19]
Watanabe et al.

[11] Patent Number: 5,870,163
[45] Date of Patent: Feb. 9, 1999

[54] LCD DEVICE WITH CONNECTION LINES HAVING DIFFERENT RESISTANCES

[75] Inventors: Makoto Watanabe; Osamu Sukegawa; Takahiko Watanabe, all of Tokyo, Japan

[73] Assignee: NEC Corporation, Tokyo, Japan

[21] Appl. No.: 791,612

[22] Filed: Jan. 31, 1997

[30] Foreign Application Priority Data

Jan. 31, 1996 [JP] Japan .................................. 8-014974

[51] Int. Cl.$^6$ .............................................. G02F 1/1395
[52] U.S. Cl. ........................... 349/149; 349/151; 349/152
[58] Field of Search .................................. 397/149, 151, 397/152

[56] References Cited

U.S. PATENT DOCUMENTS

| | | | |
|---|---|---|---|
| 4,297,004 | 10/1981 | Nishimura et al. | 349/149 |
| 4,838,656 | 6/1989 | Stoddard | 349/150 |
| 5,499,131 | 3/1996 | Kim | 349/149 |
| 5,670,994 | 9/1997 | Kawaguchi et al. | 349/150 |

FOREIGN PATENT DOCUMENTS

| | | | |
|---|---|---|---|
| 0 261 369 | 3/1988 | European Pat. Off. | 349/149 |
| 61-56322 | 3/1986 | Japan | 349/152 |
| 62-240934 | 10/1987 | Japan | 349/152 |
| 572563 | 3/1993 | Japan . | |

*Primary Examiner*—William L. Sikes
*Assistant Examiner*—Toan Ton
*Attorney, Agent, or Firm*—Sughrue, Mion, Zinn, Macpeak & Seas, PLLC

[57] ABSTRACT

An LCD device that is able to remove the luminance unevenness on the display area while preventing the short-circuit and open-circuit is provided. The LCD device includes a liquid-crystal panel having first and second substrates and liquid crystal filled in a space formed between the first and second substrates. Pixel electrodes are formed on the first substrate and are arranged in a matrix array in a display area of the panel. Driving lines are formed on the first substrate in the display area and are electrically connected to the respective pixel electrodes. Terminal areas are formed on the first substrate outside the display area. Driver ICs are mounted on the first substrate outside the display area and are electrically connected to the corresponding terminal areas. Connection lines are formed on the first substrate outside the display area and are electrically connected to the respective driving lines and the corresponding terminal areas. The resistance difference of any adjacent two ones of the connection lines is lower than a threshold resistance value at which a man is able to recognize the luminance unevenness on the display area.

6 Claims, 10 Drawing Sheets

LCD DEVICE WITH CONNECTION LINES HAVING DIFFERENT RESISTANCES

BACKGROUND OF THE INVENTION

1. Field of the Invention

The present invention relates to a liquid-crystal display device and more particularly, to a liquid-crystal display device applicable to display equipment for a notebook-sized personal computer, a car navigation system, or the like.

2. Description of the Prior Art

Figure 1A:
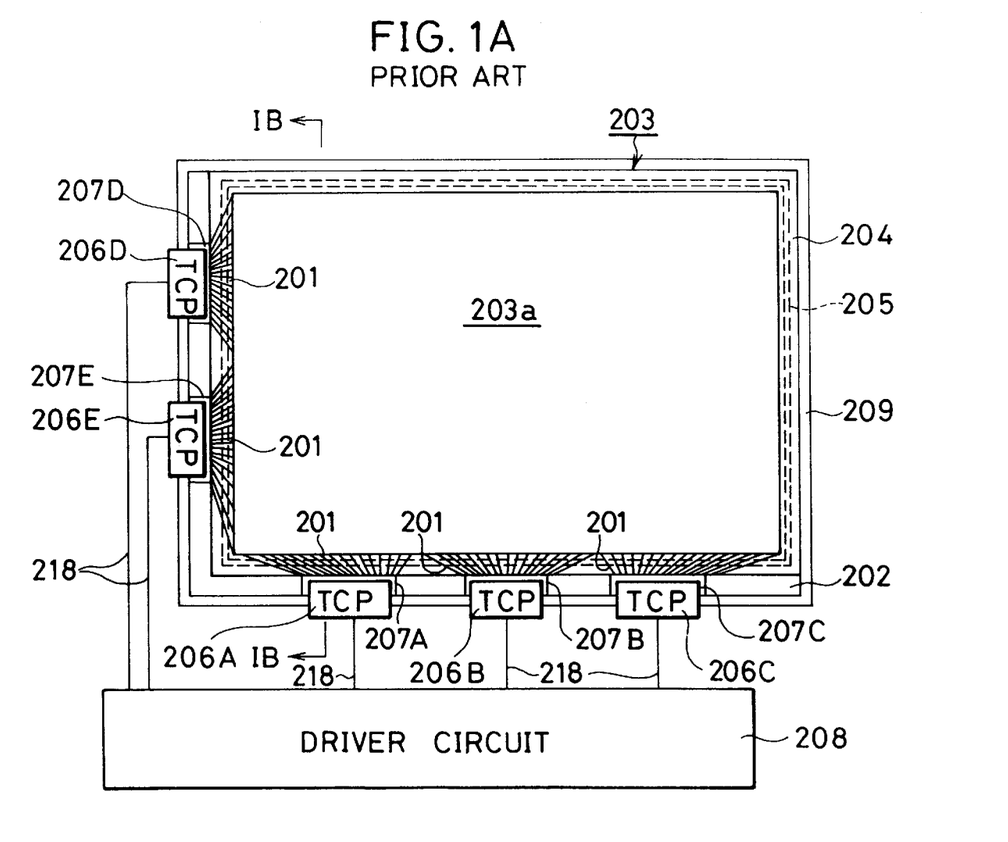
FIG. 1A is a schematic plan view of a conventional LCD device.
Figure 1B:
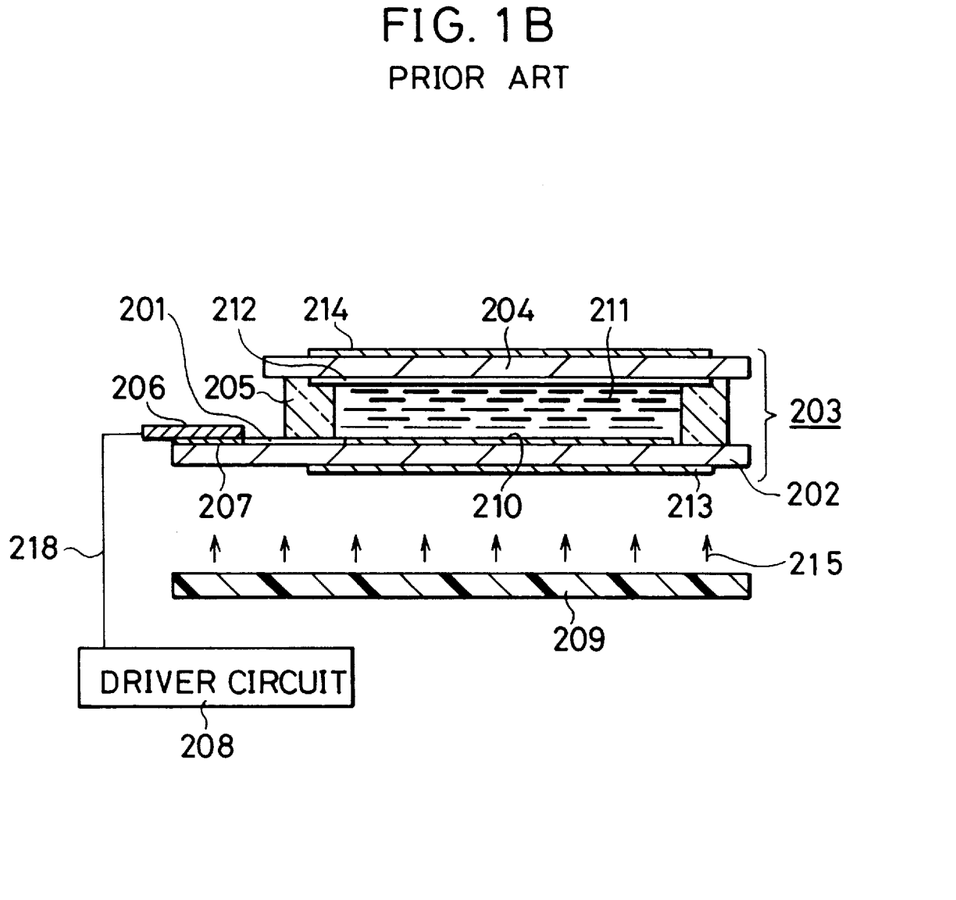
FIG. 1B is a schematic cross-sectional view of the conventional LCD device along the line IB and IB in FIG. 1A.

FIGS. 1A and 1B schematically show the configurations of a conventional Liquid-Crystal Display (LCD) device. As shown in FIGS. 1A and 1B, this conventional LCD device includes a liquid-crystal panel 203, a backlight unit 209 fixed apart from the panel 203, and a driver circuit unit 208 provided outside the panel 203. The backlight unit 209 emits backlight 215 toward the panel 203. The driver circuit unit 208 sends driving signals to the panel 203 generated-by driver circuits through lines 218.

The panel 203 has a first transparent-glass substrate 202 and a second transparent-glass substrate 204 fixed to be opposite to and apart from the first substrate 202 by a sealing member 205. A space is formed by the first and second substrates 202 and 204 and the member 205 between the substrates 202 and 204. The space is filled with liquid crystal 211.

On a surface of the first substrate 202 on the opposite side to the backlight unit 209, transparent pixel electrodes (not shown), Thin-Film Transistors (TFTs) (not shown), storage capacitors (not shown), signal lines 210, scanning lines (not shown), connection lines 201, and terminal areas 207A, 207B, 207C, 207D, and 207E are formed.

The pixel electrodes, the corresponding TFTs, and the corresponding capacitors constitute individual pixels of the display area 203a of the panel 203, which are arranged in a matrix array within the display area 203a. The connection lines 201 are located outside the display area 203a. The terminal areas 207A, 207B, 207C, 207D, and 207E are also located outside the display area 203a. The terminal areas 207A, 207B, and 207C are formed at an end of the first substrate 202, which are used for electrically connecting the signal lines 210 to the driver circuit unit 208. The terminal areas 207D and 207E are formed at another end of the first substrate 202, which are used for electrically connecting the scanning lines to the driver circuit unit 208.

The signal lines 210 are arranged at regular intervals to extend vertically in FIG. 1A. The signal lines 210 are electrically connected to the sources of the corresponding TFTs, respectively. On the other hand, the scanning lines are arranged at regular intervals to extend horizontally in FIG. 1A. The scanning lines are perpendicular to the signal lines 210. The scanning lines are electrically connected to the gates of the corresponding TFTs, respectively. The pixel electrodes are electrically connected to the drains of the corresponding TFTs, respectively.

The TFTs are located at the respective intersections of the signal lines 210 and the scanning lines.

A third part of the signal lines 210 are electrically connected to the terminal area 207A through the corresponding connection lines 201. A Tape Carrier Package (TCP) 206A including a driver Integrated-Circuit (IC) chip (not shown) therein is mounted on the terminal area 207A. The IC chip is electrically connected to the corresponding signal lines 210 and is driven by the driver circuit unit 208 through the corresponding line 218.

Another third part of the signal lines 210 are electrically connected to the terminal area 207B through the corresponding connection lines 201. A TCP 206B including a driver IC chip (not shown) therein is mounted on the terminal area 207B. The IC chip is electrically connected to the corresponding signal lines, 210 and is driven by the driver circuit unit 208 through the corresponding line 218.

The remaining third part of the signal lines 210 are electrically connected to the terminal area 207C through the corresponding connection lines 201. A TCP 206C including a driver IC chip (not shown) therein is mounted on the terminal area 207C. The IC chip is electrically connected to the corresponding signal lines 210 and is driven by the driver circuit unit 208 through the corresponding line 218.

A half part of the scanning lines are electrically connected to the terminal area 207D through the corresponding connection lines 201. A TCP 206D including a driver IC chip (not shown) therein is mounted on the terminal area 207D. The IC chip is electrically connected to the corresponding signal lines 210 and is driven by the driver circuit unit 208 through the corresponding line 218.

The remaining half part of the scanning lines are electrically connected to the terminal area 207E through the corresponding connection lines 201. A TCP 206E including a driver IC chip (not shown) therein is mounted on the terminal area 207E. The IC chip is electrically connected to the corresponding signal lines 210 and is driven by the driver circuit unit 208 through the corresponding line 218.

On an opposite surface of the first substrate 202 in the sides near the backlight unit 209, a polarizer plate 213 is fixed.

On a surface of the second substrate 204 in the side near the backlight unit 209, a transparent common electrode 212 is formed to be opposite to the pixel electrodes on the first substrate 202.

On an opposite surface of the second substrate 204 in the opposite side to the backlight unit 209, a polarizer plate 214 is fixed.

Next, the operation of the above conventional LCD device is explained below.

A constant voltage is applied to the common electrode 212 of the liquid-crystal panel 203 during the operation. Signal voltages and scanning voltages, which correspond to the image information to be displayed and which is sent from the driver circuit unit 208, are applied to the respective pixel electrodes. The signal voltages are sent through the TCPs 206A, 206B and 206C, the corresponding connection lines 201 to the TCPs 206A, 206B and 206C, and the signal lines 210. The scanning voltages are sent through the TCPs 206D and 206E, the corresponding connection lines 201 to the TCPs 206D and 206E, and the scanning lines.

The effective voltages applied across the respective pixel electrodes and the common electrode 212 cause the change in optical transmittivity of the liquid crystal 211 at the corresponding locations to the pixel electrodes dependent upon the optical characteristics of the liquid crystal 211. The change in optical transmittivity of the liquid crystal 211 leads the change in optical strength of the backlight 215 on the opposite side of the liquid-crystal panel 203 to the backlight unit 209.

Thus, the image is displayed in the display area 203a of the panel 203.

With the conventional LCD device as shown in FIGS. 1A and 1B, as seen from FIG. 1A, the TCPs 206A, 206B, and 206C are not arranged equally or uniformly with respect to the display area 203a of the panel 203. Therefore, the connection lines 201 corresponding to the TCP 206A, which extend radially from the terminal area 207A, have different lengths. For example, the resistance of the first to (n/3)-th connection lines 201 corresponding to the TCP 206A varies according to the broken line A1 shown in FIG. 7.

Similarly, the connection lines 201 corresponding to the TCP 206B, which extend radially from the terminal area 207B, have different lengths. The resistance of the [(n/3)+1]-th to [(2n/3)]-th connection lines 201 corresponding to the TCP 206B varies according to the broken line A2 shown in FIG. 7. Further, the connection lines 201 corresponding to the TCP 206C, which extend radially from the terminal area 207C, have different lengths. The resistance of the [(2n/3)+1]-th to n-th connection lines 201 corresponding to the TCP 206C varies according to the broken line A3 shown in FIG. 7.

Figure 7:
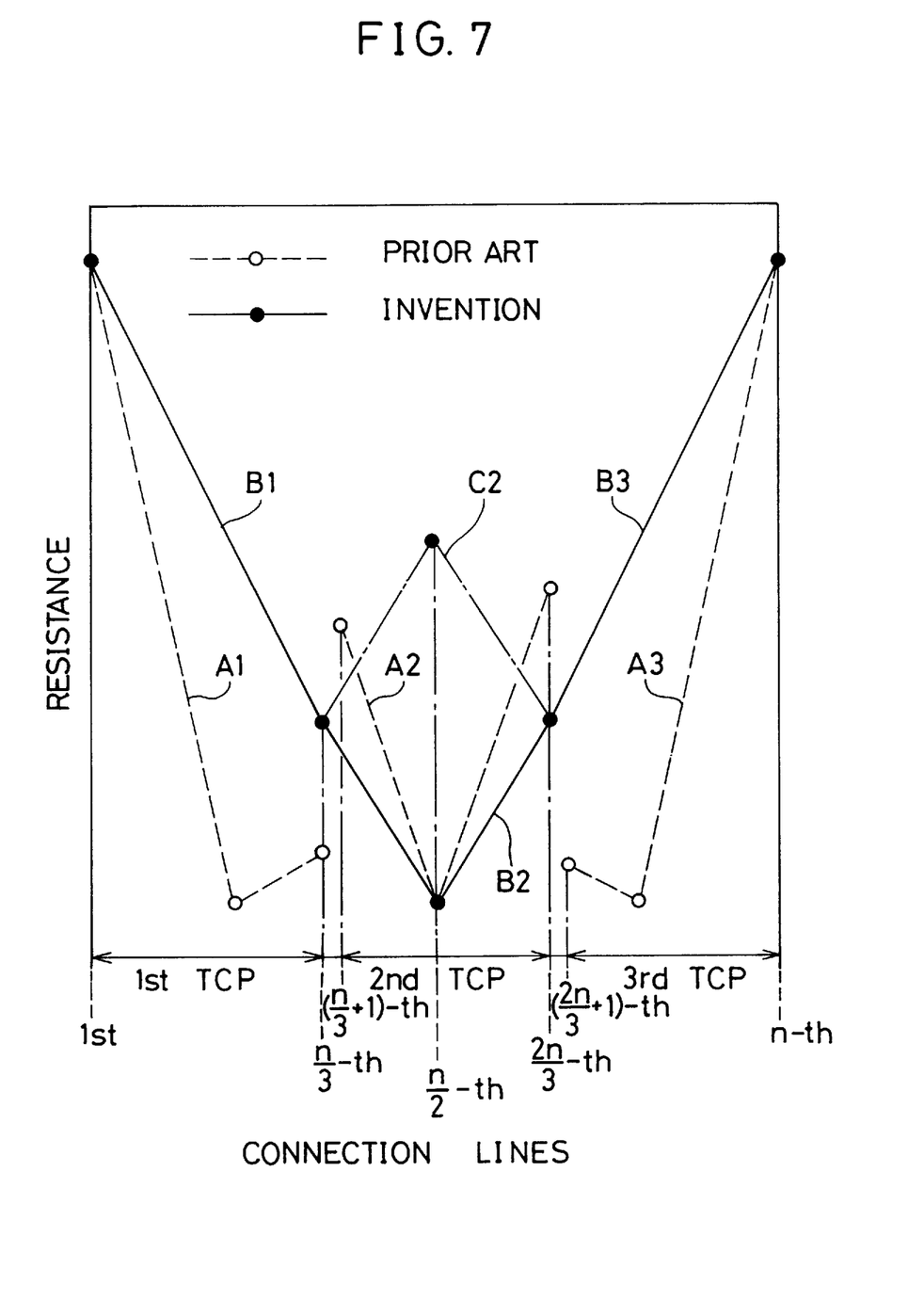
FIG. 7 is a graph showing the change of the resistance of the connection lines in the conventional LCD device of FIGS. 1A and 1B and the LCDs according to the first and second embodiments of the present invention.

As a result, the resistance of the adjacent (n/3)-th and [(n/3)+1]-th connection lines 201 located at the interface between the TCPs 206A and 206B varies drastically. Similarly, the resistance of the adjacent (2n/3)-th and [(2n/3)+1]-th connection lines 201 located at the interface between the TCPs 206B and 206C varies drastically.

The resistance difference between the adjacent two connection lines 201 causes the effective voltage difference, thereby changing drastically the optical transmittivity of the panel 203 at the interface between the adjacent two TCPs. If the change of the optical transmittivity is equal to 2% or more with respect to the total optical transmittivity, a man is able to sense and recognize this change as luminance unevenness on the display area 203a. This leads to degradation of the display quality.

The threshold value of the resistance difference between the adjacent two connection lines 201 at which a man is able to recognize the luminance unevenness is equal to approximately 200 Ω.

The above explanation about the TCPs 206A, 206B, and 206C is applicable to the remaining TCPs 206D and 2OOE for the scanning lines.

Although the connection lines 201 are formed to extend along straight lines in FIGS. 1A and 1B, they may be formed to be bent like cranks.

Figure 2A:
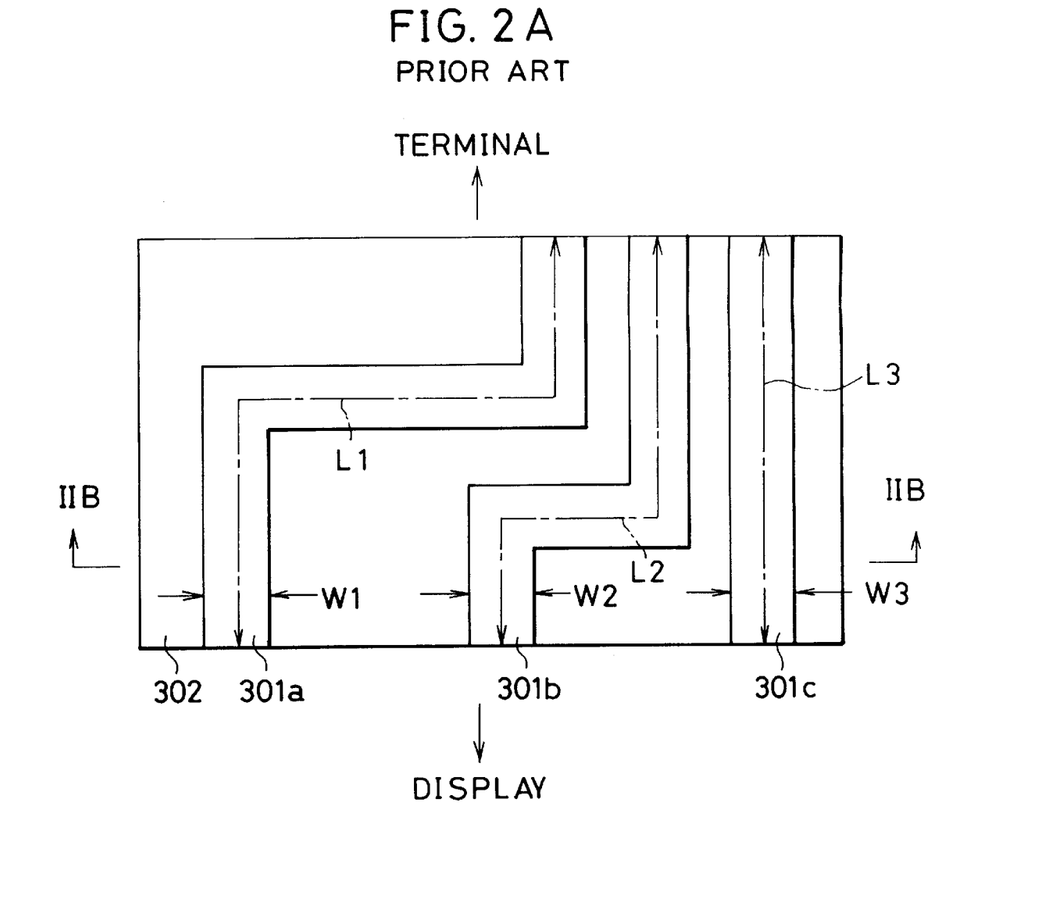
FIG. 2A is a schematic, partial plan view showing the connection lines of another conventional LCD device.
Figure 2B:
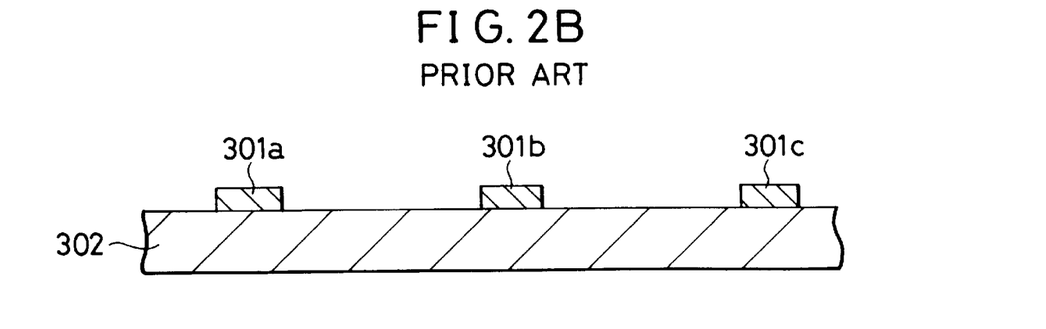
FIG. 2B is a schematic, partial cross-sectional view of the conventional LCD device along the line IIB and IIB in FIG. 2A.

To solve the problem of the luminance unevenness, an improved configuration as shown in FIGS. 2A and 2B was developed, which was disclosed in the Japanese Non-Examined Patent Publication No. 5-72563 published in March 1993.

The improved configuration includes first to n-th connection lines. However, only first to third connection lines 301a, 301b, and 301c are shown in FIGS. 2A and 2B for the sake of simplification of description.

In FIGS. 2A and 2B, first to third connection lines 301a, 301b, and 301c are formed on a glass substrate 302. The first line 301a has a width of W1 and a length of L1. The second line 301b has a width of W2 and a length of L2. The third line 301c has a width of W3 and a length of L3. Similarly, the n-th line has a width of Wn and a length of Ln.

The lengths and the widths of the first to n-th connection lines have a relationship of $$L1/W1 = L2/W2 = L3/W3 = \ldots = Ln/Wn \tag{1}$$

This relationship (1) means that the first to n-th connection lines have the same resistance. Therefore, the improved configuration is able to substantially delete the effective voltage fluctuation applied to the respective pixel electrodes, resulting in the image with no luminance unevenness.

With the improved configuration disclosed in the Japanese Non-Examined Patent Publication No. 5-72563, however, the following problem will occur.

Specifically, since the ratios of the length and width of the first to n-th connection lines are designed to be the same, the problem of the luminance unevenness can be solved. However, there is a possibility that an extremely narrow connection line and/or an extremely narrow gap between the adjacent two connection lines is generated.

For example, when the first connection line has a length L1 of 10000 $\mu$m and a width W1 of 20 $\mu$m, and the hundredth connection line has a length L100 of 2000 $\mu$m, the hundredth connection line needs to have a width W100 of 4 $\mu$m. Such extremely narrow line tends to cause open-circuit or disconnection, thereby decreasing the fabrication yield of the LCD device.

If the narrowest connection line is designed to be comparatively wide in order to prevent the open-circuit or disconnection of the connection lines, the gap between the comparatively wide connection lines becomes narrow. This results in the tendency of short-circuit of the connection lines.

SUMMARY OF THE INVENTION

Accordingly, an object of the present invention is to provide an LCD device that is able to remove the luminance unevenness on the display area while preventing the short- and open-circuit.

An LCD device according to the present invention includes a liquid-crystal panel having first and second substrates and liquid crystal filled in a space formed between the first and second substrates.

Pixel electrodes are formed on the first substrate and are arranged in a matrix array in a display area of the panel. Driving lines are formed on the first substrate in the display area and are electrically connected to the respective pixel electrodes.

Terminal areas are formed on the first substrate outside the display area. Driver ICs are mounted on the first substrate outside the display area and are electrically connected to the corresponding terminal areas. Connection lines are formed on the first substrate outside the display area and are electrically connected to the respective driving lines and the corresponding terminal areas.

The resistance difference of any adjacent two ones of the connection fines is lower than a threshold resistance value at which a man is able to recognize the luminance unevenness on the display area.

With the LCD device according to the present invention, since the resistance difference of any adjacent two ones of the connection lines is lower than a threshold resistance value at which a man is able to recognize the luminance unevenness on the display area, no luminance unevenness recognizable to a man occurs on the display area.

Further, because the connection lines do not need to have the same resistance, not only the width of the respective connection lines but also the gap between the adjacent connection lines can be designed with a comparatively high-degree of freedom so as not to cause short-circuit or open-circuit between the adjacent connection lines. As a result, the possibility of the short-circuit and the open-circuit of the connection lines can be deleted.

In a preferred embodiment of the device according to the present invention, the connection lines include a first part (i.e., group) in which the resistance increases monotonously according to the sequence or order of the connection lines and a second part (i.e., group) in which the resistance decreases monotonously according to the sequence or order of the connection lines.

In this case, the difference between the maximum and minimum resistance values of the connection lines can be decreased and therefore, there is an additional advantage that image quality can be improved.

In another preferred embodiment of the device according to the present invention, each of the connection lines has a multi-layer structure including a first patterned conductive layer formed on the first substrate and a second patterned conductive layer formed on the first conductive layer. The second conductive layer is electrically connected to the first conductive layer.

In this case, there arises an additional advantage that the resistance of each of the connection lines is able to be adjusted by changing the resistance of the second conductive layer together with the resistance of the first conductive layer.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described below referring to the drawings attached.

First Embodiment

Figure 3:
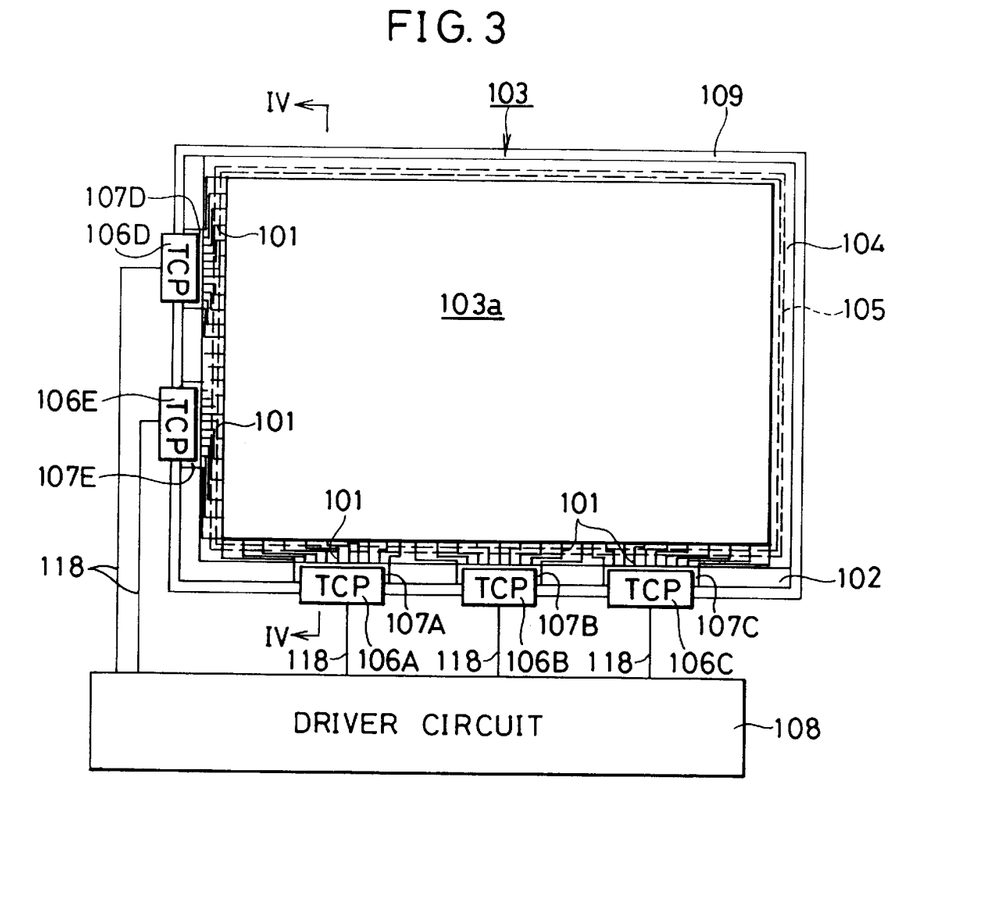
FIG. 3 is a schematic plan view of an LCD device according to a first embodiment of the present invention.
Figure 4:
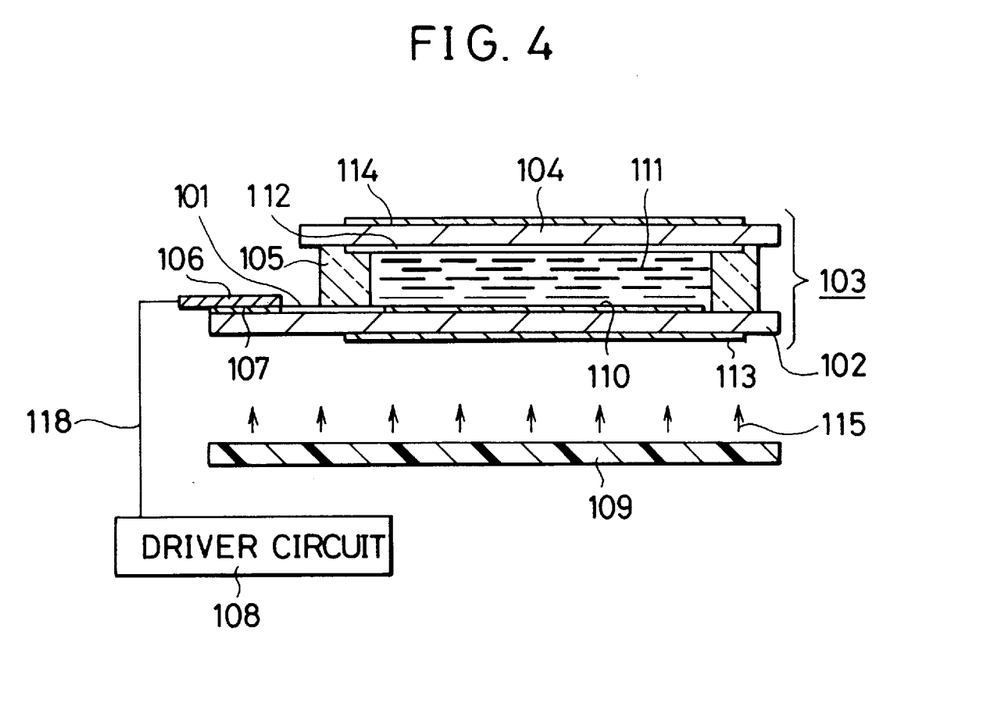
FIG. 4 is a schematic cross-sectional view of the LCD device according to the first embodiment along the line IV and IV in FIG. 3.

An LCD device according to a first embodiment is shown in FIGS. 3 and 4, which has substantially the same configuration as that of the conventional LCD device shown in FIGS. 1A and 1B except for the connection lines.

Specifically, the LCD device according to the first embodiment includes a liquid-crystal panel 103, a backlight unit 109, and a driver circuit unit 108. The backlight unit 109 emits backlight 115 toward the panel 103. The driver circuit unit 108 sends driving signals to the panel 103 generated by driver circuits through lines 118.

The panel 103 has first and second transparent-glass substrates 102 and 104 fixed to be opposite to and apart from each other by a sealing member 105, thereby forming a space between the substrates 102 and 104. The space is filled with liquid crystal 111.

Transparent pixel electrodes (not shown), TFTs (not shown), storage capacitors (not shown), signal lines 210, scanning lines (not shown), connection lines 101, and terminal areas 107A, 107B, 107C, 107D, and 107E are formed on a surface of the first substrate 102.

The pixel electrodes, the corresponding TFTs, and the corresponding capacitors constitute individual pixels of the LCD device of the first embodiment, which are arranged in a matrix array within a display area 103a of the liquid-crystal panel 103.

The connection lines 101 are located outside the display area 103a. Unlike the above conventional LCD device shown in FIGS. 1A and 1B, the connection lines 101 have a plan shape which is bent like a crank or which extends along a straight line.

The terminal areas 107A, 107B, 107C, 107D, and 107E are located outside the display area 203a. The three terminal areas 107A, 107B, and 107C are formed at an end of the first substrate 102, which are used for electrically connecting the signal lines 110. The two terminal areas 107D and 107E are formed at another end of the first substrate 102, which are used for electrically connecting the scanning lines.

The signal lines 110 are located in the display area 103a and are arranged at regular intervals to extend vertically in FIG. 3. The signal lines 110 are electrically connected to the sources of the corresponding TFTs, respectively. On the other hand, the scanning lines are located in the display area 103a and are arranged at regular intervals to extend horizontally in FIG. 3. The scanning lines are perpendicular to the signal lines 110. The scanning lines are electrically connected to the gates of the corresponding TFTs, respectively. The pixel electrodes are electrically connected to the drains of the corresponding TFTs, respectively.

The TFTs are located at the respective intersections of the signal lines 110 and the scanning lines in the display area 103a.

Similar to the conventional LCD device of FIGS. 1A and 1B, a third part of the signal lines 110 are electrically connected to the terminal area 107A through the corresponding connection lines 101. A TCP 106A including a driver IC chip (not shown) therein is mounted on the terminal area 107A. The IC chip is electrically connected to the corresponding signal lines 110 and is driven by the driver circuit unit 108 through the corresponding line 118.

Another third part of the signal lines 110 are electrically connected to the terminal area 107B through the corresponding connection lines 101. A TCP 206B including a driver IC chip (not shown) therein is mounted on the terminal area 107B. The IC chip is electrically connected to the corresponding signal lines 110 and is driven by the driver circuqit unit 108 through the corresponding line 118.

The remaining third part of the signal lines 110 are electrically connected to the terminal area 107C through the corresponding connection lines 101. A TCP 106C including a driver IC chip (not shown) therein is mounted on the terminal area 107C. The IC chip is electrically connected to the corresponding signal lines 110 and is driven by the driver circuit unit 108 through the corresponding line 118.

A half part of the scanning lines are electrically connected to the terminal area 107D through the corresponding connection lines 101. A TCP 106D including a driver IC chip (not shown) therein is mounted on the terminal area 107D. The IC chip is electrically connected to the corresponding signal lines 110 and is driven by the driver circuit unit 108 through the corresponding line 118.

The remaining half part of the scanning lines are electrically connected to the terminal area 107E through the corresponding connection lines 101. A TCP 106E including a driver IC chip (not shown) therein is mounted on the terminal area 107E. The IC chip is electrically connected to the corresponding signal lines 110 and is driven by the driver circuit unit 108 through a corresponding line 118.

A polarizer plate 113 is fixed on an opposite surface of the first substrate 102 in the side near the backlight unit 109.

A transparent common electrode 112 is formed to be opposite to the pixel electrodes on the first substrate 102 on a surface of the second substrate 104 in the side near the backlight unit 109.

A polarizer plate 114 is fixed on an opposite surface of the second substrate 104 in the opposite side to the backlight unit 109.

Figure 5A:
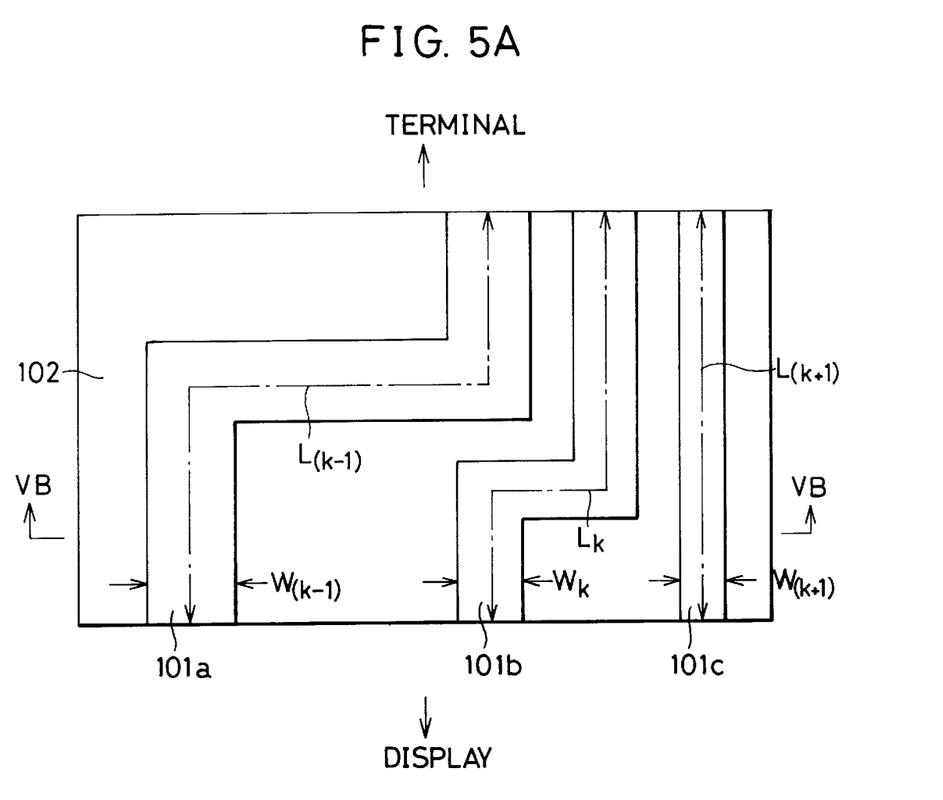
FIG. 5A is a schematic, partial plan view showing the connection lines of an LCD device according to a second embodiment of the present invention.
Figure 5B:
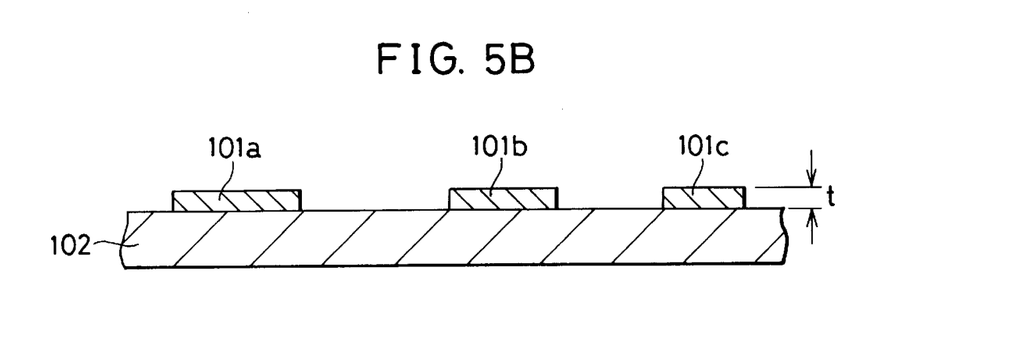
FIG. 5B is a schematic, partial cross-sectional view of the LCD device according to the second embodiment along the line VB and VB in FIG. 5A.

The connection lines 101 of the LCD device according to the first embodiment have the configuration as shown in FIGS. 5A and 5B. This LCD device includes the first to n-th connection lines. However, only a (k−1)-th line 101$a$, a k-th line 101$b$, and a (k+1)-th line 101$c$ are shown in FIGS. 5A and 5B for the sake of simplification of description, where k is a natural number greater than unity (i.e., k>1).

In FIGS. 5A and 5B, each of the (k−1)-th, k-th, and (k+1)-th connection lines 101$a$, 101$b$, and 101$c$ is made of a patterned metal layer formed on the glass substrate 102. The metal layer has a resistivity $\rho$ and a thickness t.

The (k−1)-th line 101$a$ has a width of $W_{k-1}$ and a length of $L_{k-1}$. The k-th line 101$b$ has a width of $W_k$ and a length of $L_k$. The (k+1)-th line 101$c$ has a width of $W_{k+1}$ and a length of $L_{k+1}$. The lengths and the widths of the connection lines 101$a$, 101$b$, and 101$c$ have a relationship of $$(\rho/t) \cdot |L_{k-1}/W_{k-1} - L_k/W_k| < R_c \quad (2)$$

where $R_c$ is a threshold resistance value at which a man is able to recognize the luminance unevenness on the display area 103$a$ of the panel 103.

In other words, the following relationships (3-1), (3-2), . . . , and (3-n) are satisfied for the first to n-th connection lines.

$$(\rho/t) \cdot |L_1/W_1 - L_2/W_2| < R_c \quad (3\text{-}1)$$

$$(\rho/t) \cdot |L_2/W_2 - L_3/W_3| < R_c \quad (3\text{-}2)$$

$$\vdots$$

$$(\rho/t) \cdot |L_{n-1}/W_{n-1} - L_n/W_n| < R_c \quad (3\text{-}n)$$

Figure 6:
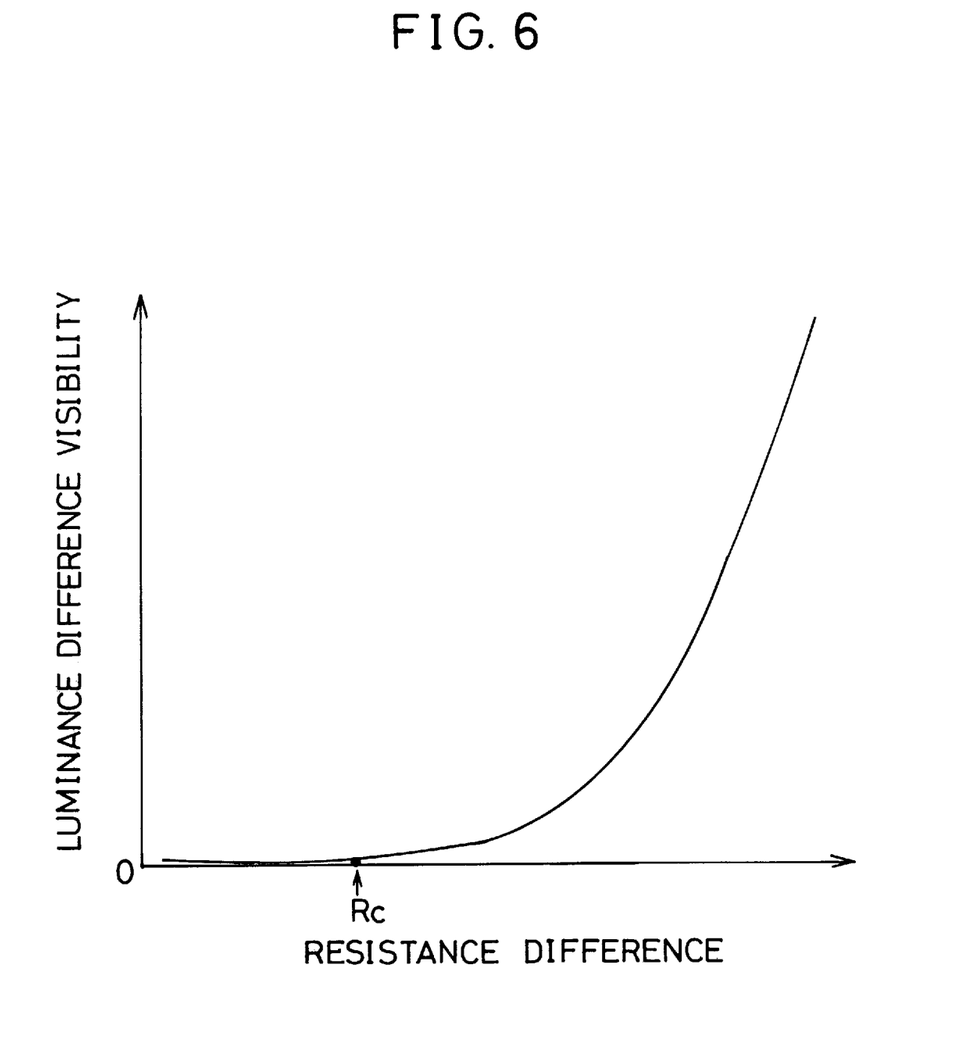
FIG. 6 is a graph showing the relationship between the resistance difference between the adjacent connection lines and the luminance difference visibility of a man.

This means that the resistance difference of the adjacent two ones of the first to n-th connection lines 101 is lower than the threshold resistance value $R_c$. Therefore, as shown in FIG. 6, the luinance difference visible to a man is equal to approximately zero and as a result, no luminance unevenness recognizable by man occurs on the display area 103$a$.

Further, because the connection lines 101 to have the same resistance, not only the width of the respective connection lines 101 but also the gap between the adjacent two ones of the connection lines 101 can be designed with a comparatively high-degree of freedom so as not to cause short-circuit nor open-circuit between the adjacent two ones of the connection lines. As a result, the possibility of the short-circuit and open-circuit of the connection lines 101 can be deleted.

The resistance of the first to n-th connection lines 101 varies according to the solid lines B1, B2, and B3 shown in FIG. 7. Specifically, the resistance of the first and n-th connection lines 101 is at the maximum, and the resistance of the (n/2)-th connection line is at the minimum. The resistance monotonously decreases according to the order or sequence of the lines 101 between the first and (n/2)-th connection lines 101. The resistance monotonously increases according to the order or sequence of the lines 101 between the [(n/2)+1]-th and n-th connection lines 101.

In the device according to the first eodient, the total difference between the maximum and minimum resistance values of the first to n-th connection lines 101 is the same as that of the conventional LCD device of FIGS. 1A and 1B. However, the luminance unevenness recognizable by man can be simply prevented.

It is preferred that the connection lines 101 for both of the signal lines 110 and the scanning lines are designed to satisfy the above relationship (2).

Second Embodiment

An LCD device according to a second embodiment has the same configuration as that of the first embodiment except that the resistance of the first to n-th connection lines 101 varies according to the solid lines B1 and B3 and the chain lines C2, as shown in FIG. 7.

Specifically, the resistance of the first and n-th connection lines 101 is at the maximum, and the resistance of the (n/3)-th connection line 101 and the [(2n/3)+1]-th connection line 101 are at the minimum. The resistance of the (n/2)-th connection line 101 is at the middle.

The resistance of the first to (n/3)-th connection lines 101 and the (n/2)-th to (2n/3)-th connection lines 101 monotonously decreases according to the order or sequence of the lines 101. The resistance of the [(n/3)+1]-th to (n/2)-th connection lines 101 and the [(2n/3)+1]-th to n-th connection lines 101 monotonously increases according to the order or sequence of the lines 101.

In the LCD device according to the second embodiment, there is an additional advantage that the maximum resistance difference within the first to n-th connection line 101 is less than that of the first embodiment, in addition to the same advantages as those of the first embodiment.

Third Embodiment

Figure 8:
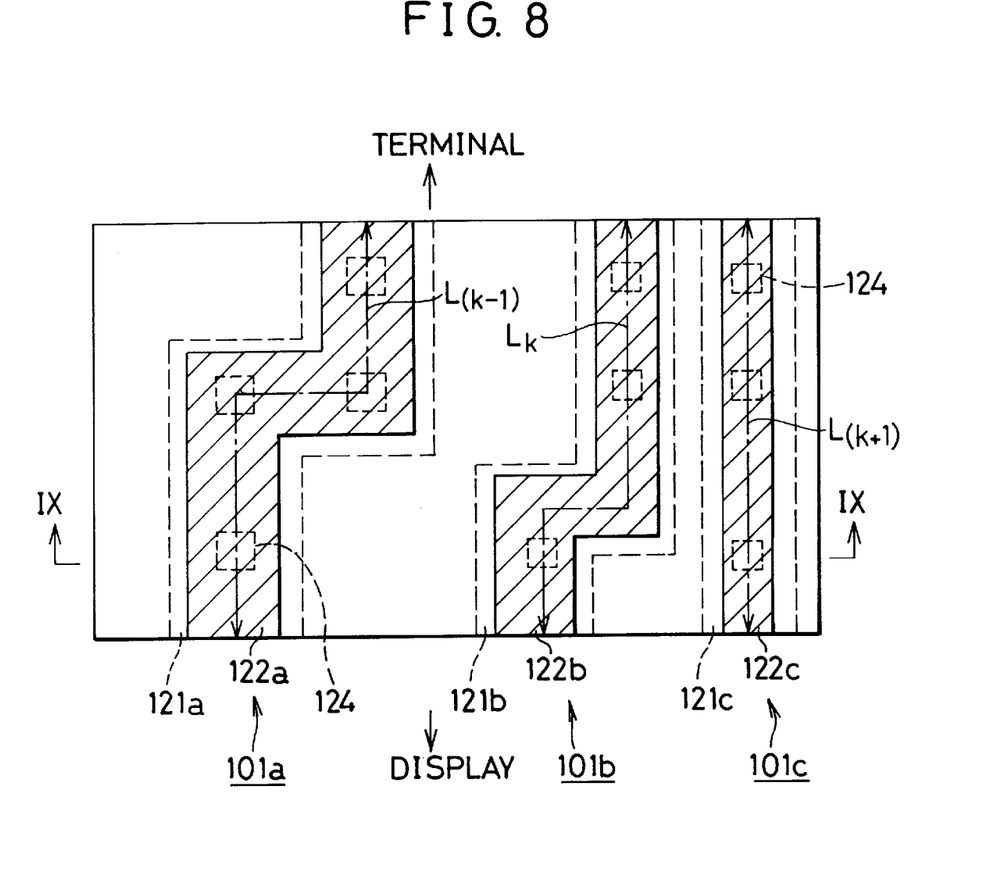
FIG. 8 is a schematic, partial plan view showing the connection lines of an LCD device according to a third embodiment of the present invention.
Figure 9:
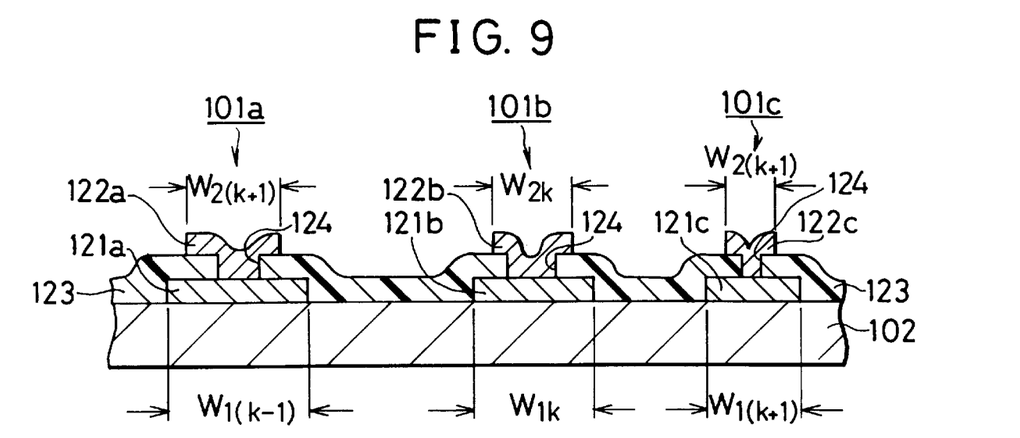
FIG. 9 is a schematic, partial cross-sectional view of the LCD device according to the third embodiment along the line IX and IX in FIG. 8

FIGS. 8 and 9 show an LCD device according to a third embodiment, which has the same configuration as that of the first embodiment except for the first to n-th connection lines 101. Specifically, unlike the LCD device according to the first embodiment, each of the connection lines 101 has a two-layer structure made of a lower patterned metal layer and an upper patterned metal layer.

Although the LCD device according to the third embodiment includes the first to n-th connection lines, only the (k−1)-th line 101a, the k-th line 101b, and the (k+1)-th line 101c are shown in FIGS. 8 and 9 for the sake of simplification of description.

In FIGS. 8 and 9, (k−1)-th, k-th, and (k+1)-th lower patterned metal layers 121a, 121b, and 121c are formed to be apart from each other on the first glass substrate 102. An insulating layer 123 is formed on the substrate 102 to cover the lower patterned metal layers 121a, 121b, and 121c. The insulating layer 123 has square contact holes 124 at the locations over the respective layers 121a, 121b, and 121c. The holes 124 are arranged on the respective lower layers 121a, 121b, and 121c at intervals.

Further, (k−1)-th, k-th, and (k+1)-th upper patterned metal layers 122a, 122b, and 122c are formed to be contacted with the underlying lower layers 121a, 121b, and 121c through the corresponding contact holes 124, respectively. Thus, each of the connection lines 101 has the two-layer structure.

The lower metal layer 121a of the (k−1)-th line 101a has a width of $W_{1(k-1)}$ and a length of $L_{(k-1)}$. The upper metal layer 122a of the (k−1)-th line 101a has a width of $W_{2(k-1)}$ and a length of $L_{(k-1)}$. The lower metal layer 122a of the k-th line 101b has a width of $W_{1k}$ and a length of $L_k$. The upper metal layer 122b of the k-th line 101b has a width of $W_{2k}$ and a length of $L_k$. The lower metal layer 121c of the (k+1)-th line 101c has a width of $W_{1(k+1)}$ and a length of $L_{(k+1)}$. The upper metal layer 122c of the (k+1)-th line 101c has a width of $W_{2(k+1)}$ and a length of $L_{(k+1)}$.

In the LCD device according to the third embodiment, there is the following additional advantage. Specifically, even when the above relationship (2) is not satisfied due to the given width of the connection lines 101 and the given gaps between the adjacent lines 101, the resistance of each of the connection lines 101a, 101b, and 101c is able to be adjusted by changing the resistance of the upper metal layers 122a, 122b, and 122c together with the resistance of the lower metal layers 121a, 121b, and 121c. Therefore, the above relationship (2) can be readily satisfied.

For example, when the resistance difference of the adjacent two ones of the lower metal layers 121a, 121b, and 121c is unable to be decreased to a value lower than the threshold resistance value $R_c$, the resistance of the upper metal layers 122a, 122b, and 122c is adjusted (i.e., increased or decreased) so that the total resistance of the lower metal layers 121a, 121b, and 121c and the upper metal layers 122a, 122b, and 122c satisfies the above relationship (2).

Therefore, the width and gap of the lower metal layers 121a, 121b, and 121c can be designed so that no short-circuit and no open-circuit occur.

The resistance of the first to n-th connection lines may vary according to the lines B1, B2, and B3 or B1, C2, and B3 shown in FIG. 7.

At least one of the lower metal layers 121a, 121b, and 121c and the upper metal layers 122a, 122b, and 122c may be transparent.

Fourth Embodiment

Figure 10:
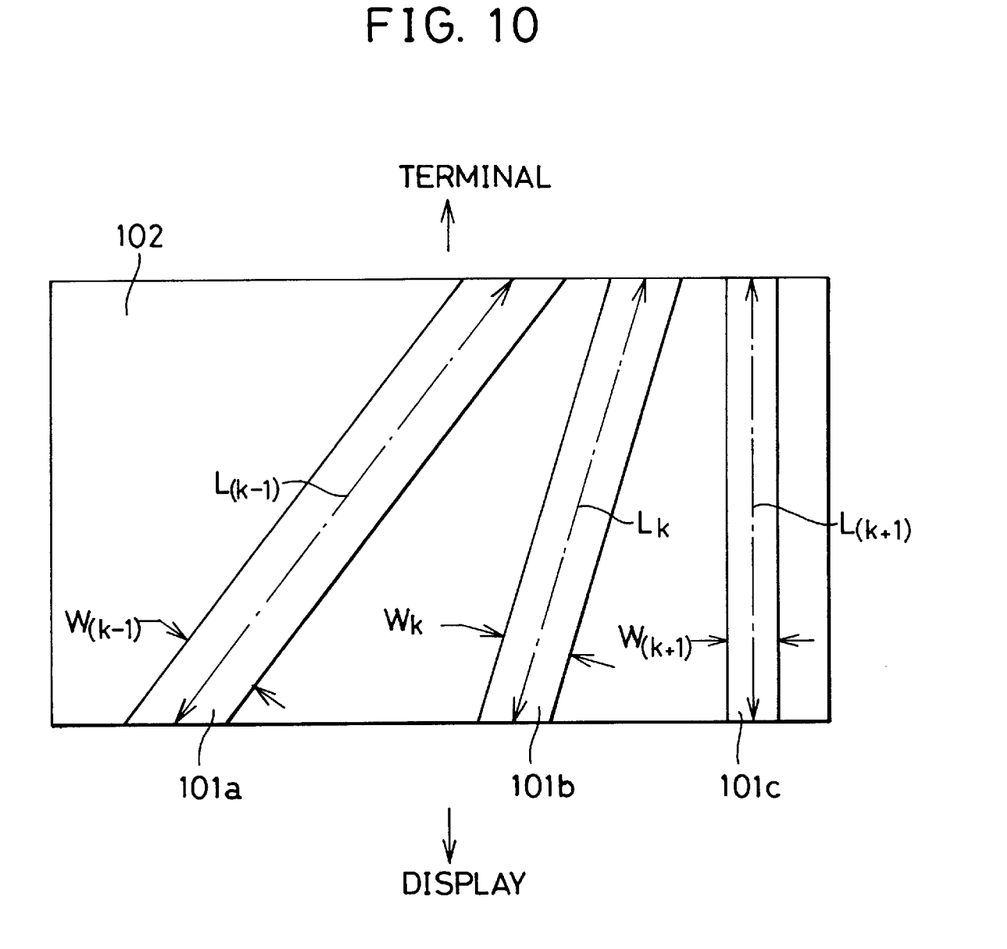
FIG. 10 is a schematic, partial plan view showing the connection lines of an LCD device according to a fourth embodiment of the present invention.

FIG. 10 shows an LCD device according to a fourth embodiment, which has the same configuration as that of the first embodiment except that the first to n-th connection lines 101 have a plan shape of a straight line extending radially from the corresponding TCPs.

The same advantage as that of the first embodiment is obtained.

Although the LCD devices according to the first to fourth embodiments are of an active matrix type, the present invention can be applied to any other type of the LCD device.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A liquid-crystal display device comprising:

a liquid-crystal panel having a first substrate, a second substrate, and liquid crystal filled in a space formed between said first substrate and said second substrate;

pixel electrodes formed on said first substrate and arranged in a matrix array in a display area of said panel;

driving lines formed on said first substrate in said display area and electrically connected to said respective pixel electrodes;

terminal areas formed on said first substrate outside said display area;

driver ICs mounted on said first substrate outside said display area and electrically connected to said corresponding terminal areas; and connection lines formed on said first substrate outside said display area and electrically connected to said respective driving lines and said corresponding terminal areas;

wherein a difference between resistances of any adjacent two of said connection lines is less than a threshold resistance at which luminance unevenness on said display area is recognizable; and wherein said resistances of any adjacent two of said connection lines are different from each other.

2. The liquid-crystal display device as claimed in claim 1 wherein said connection lines comprise a first group in which the resistance increases monotonously according to the sequence or order of said connection lines and a second group in which the resistance decreases monotonously according to the sequence or order of said connection lines.

3. The liquid-crystal display device as claimed in claim 1 wherein each of said connection lines has a multi-layer structure comprising a first patterned conductive layer formed on said first substrate, and a second patterned conductive layer formed on said first conductive layer.

4. The liquid-crystal display device as claimed in claim 3 further comprising means for adjusting the resistance of each of said connection lines by changing the resistance of said second conductive layer and the resistance of said first conductive layer.

5. The liquid-crystal display device as claimed in claim 1 wherein said threshold resistance is approximately 200 Ω.

6. The liquid-crystal display device as claimed in claim 1 wherein said difference is other than zero.

* * * * *

UNITED STATES PATENT AND TRADEMARK OFFICE
CERTIFICATE OF CORRECTION

PATENT NO.: 5,870,163
DATED: February 09, 1999
INVENTOR(S): Makoto WATANABE et al.

It is certified that error appears in the above-identified patent and that said Letters Patent is hereby corrected as shown below:

Column 3, Line 39: delete "200E" and insert --206E--

Column 4, Line 47: delete "fines" and insert --lines--

Column 8, Line 1: delete "luinance" and inset --luminance--

Column 8, Line 4: after "101" and insert --do not need--

Column 8, Line 23: delete "eodient" and insert --embodiment--

Signed and Sealed this

Twenty-ninth Day of June, 1999

*Attest:*

Q. TODD DICKINSON

*Attesting Officer*     Acting Commissioner of Patents and Trademarks